United States Patent
Kim et al.

(10) Patent No.: US 8,605,116 B2
(45) Date of Patent: Dec. 10, 2013

(54) MOBILE TERMINAL AND CONTROLLING METHOD THEREOF

(75) Inventors: Hyunseok Kim, Seoul (KR); Jungseok Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 13/232,686

(22) Filed: Sep. 14, 2011

(65) Prior Publication Data

US 2012/0162261 A1  Jun. 28, 2012

(30) Foreign Application Priority Data

Dec. 23, 2010  (KR) ........................ 10-2010-0133029

(51) Int. Cl.
*G09G 5/00*  (2006.01)

(52) U.S. Cl.
USPC .......................................... 345/647; 345/660

(58) Field of Classification Search
USPC .................................. 345/647, 173, 660, 168
See application file for complete search history.

(56) References Cited

U.S. PATENT DOCUMENTS

2011/0059775 A1*  3/2011  Choi et al. ..................... 455/566

OTHER PUBLICATIONS

Hansen, Thomas E., et al. "PyMT: a post-WIMP multi-touch user interface toolkit." Proceedings of the ACM International Conference on Interactive Tabletops and Surfaces. ACM, 2009.*

* cited by examiner

*Primary Examiner* — Kee M Tung
*Assistant Examiner* — Richard M Russell
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a touchscreen configured to display a plurality of display objects; a sensing unit configured to detect a motion of the mobile terminal; and a controller configured to move and modify a shape of the plurality of display objects to reflect a characteristic of the detected motion of the mobile terminal.

16 Claims, 18 Drawing Sheets

FIG. 5
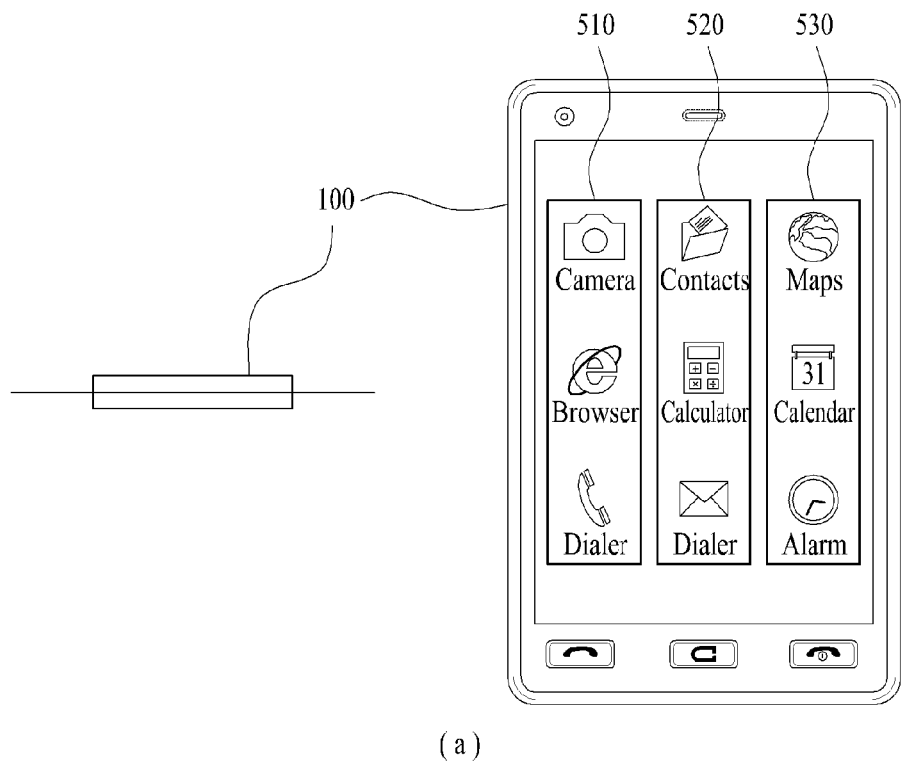
(a)
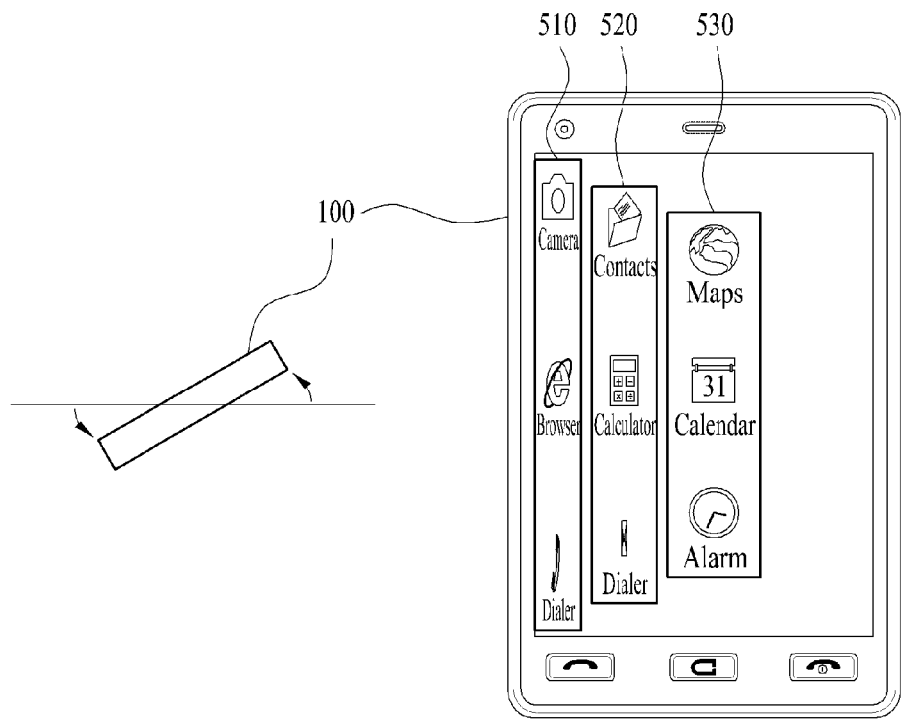
(b)

FIG. 7
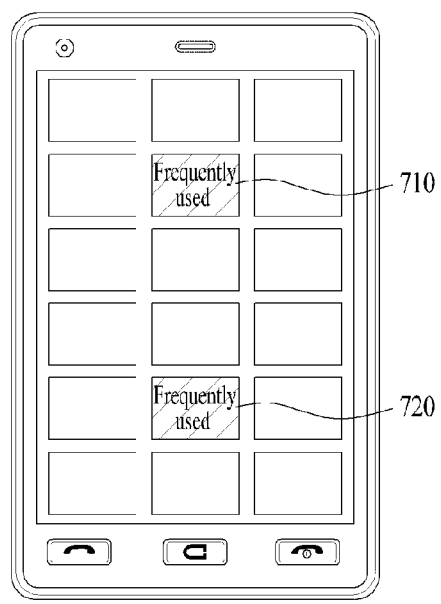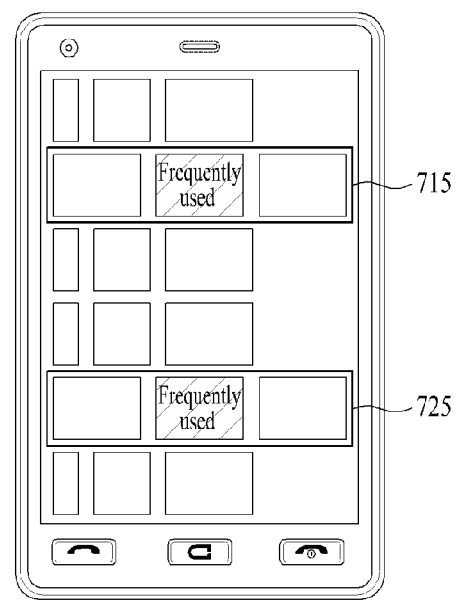
(a)
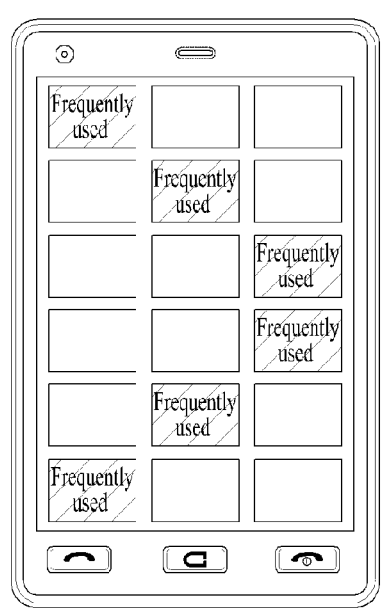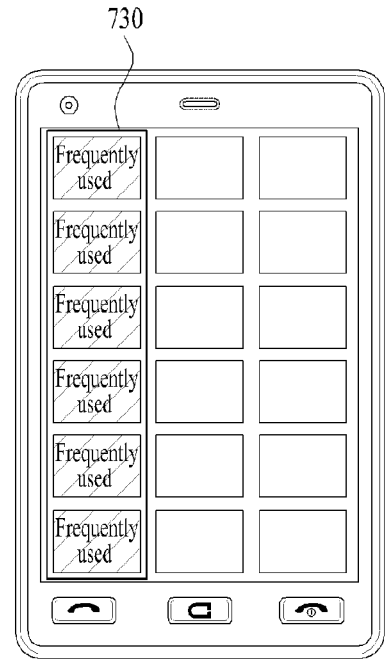
(b)

FIG. 8
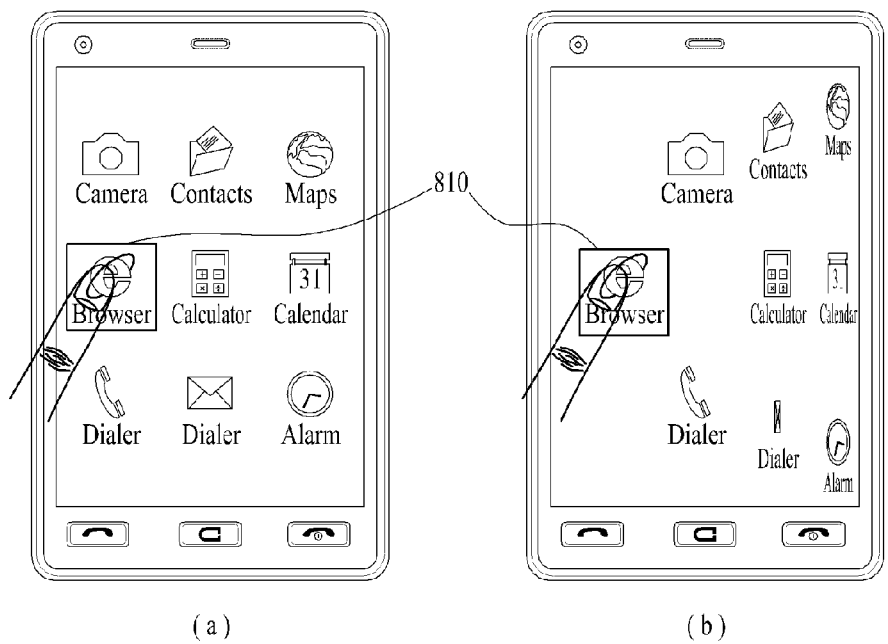
(a)   (b)
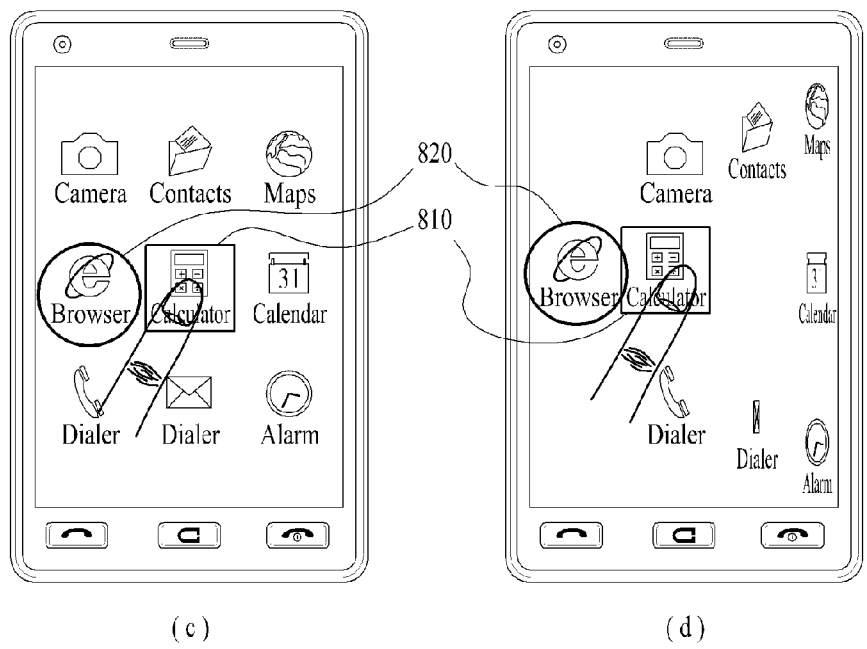
(c)   (d)

FIG. 9
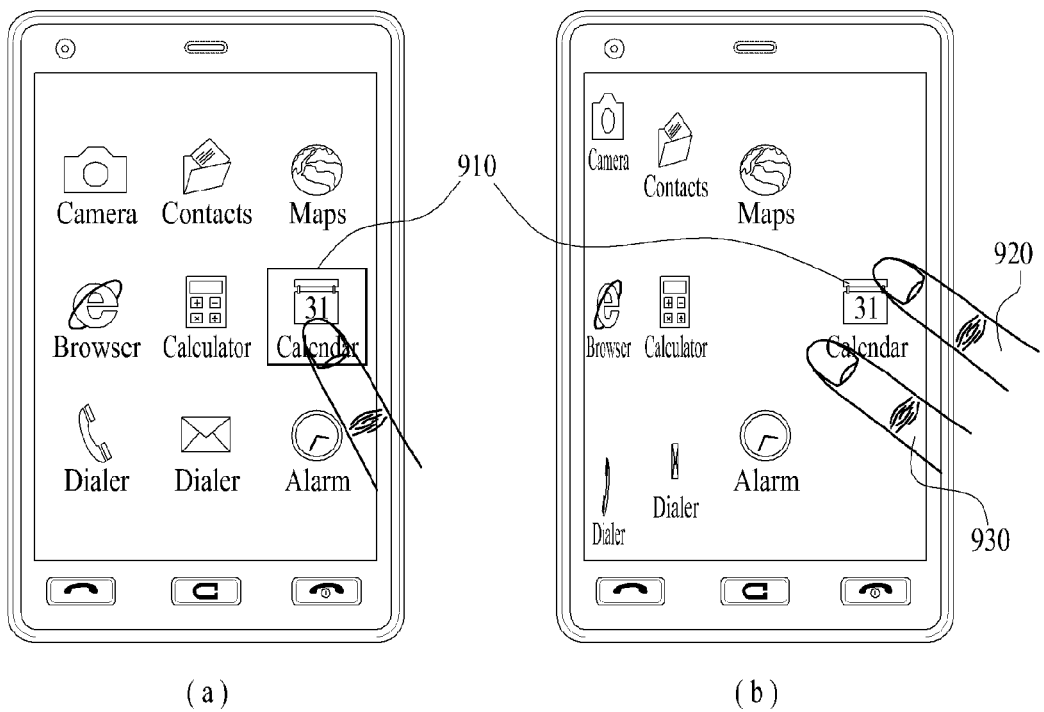
(a)   (b)
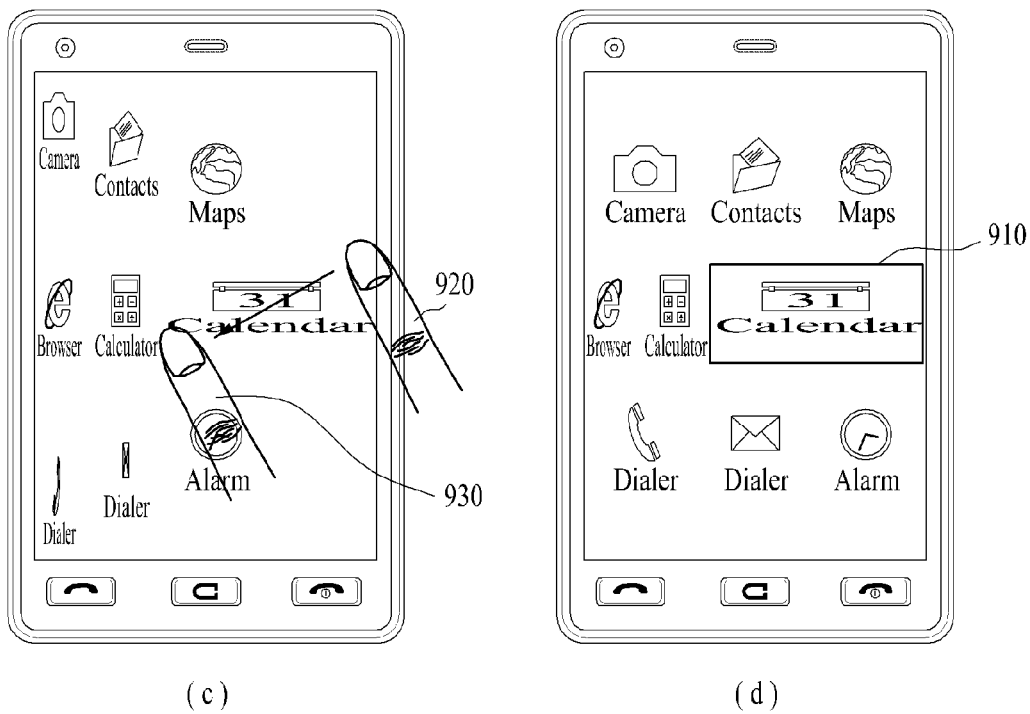
(c)   (d)

FIG. 12
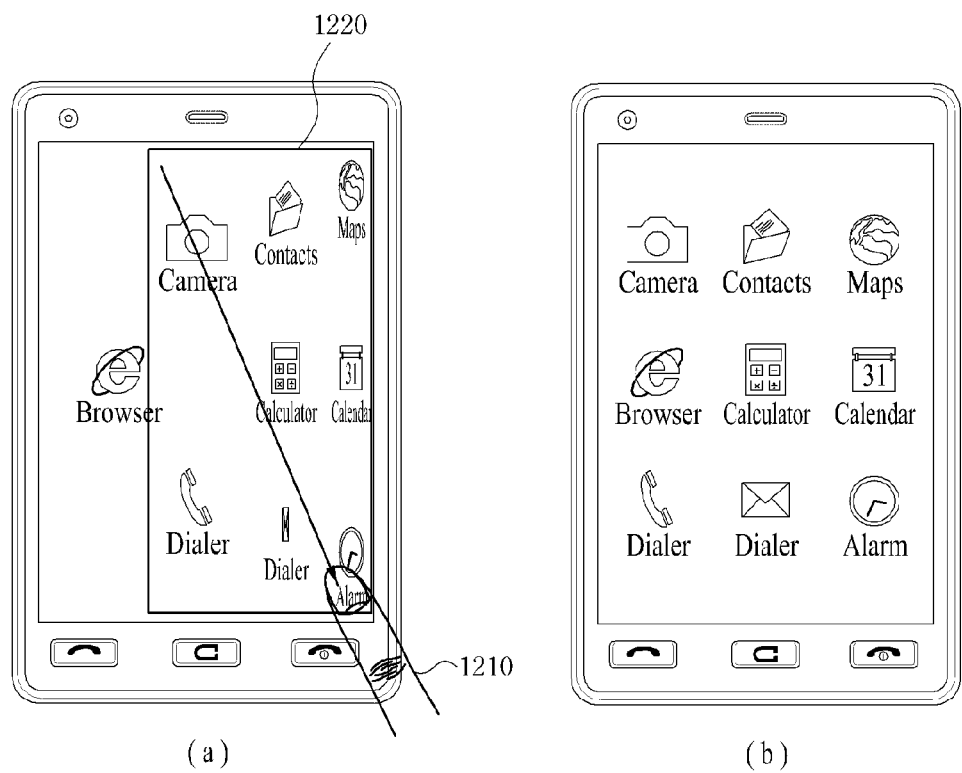
(a)　　　　　　　　　(b)
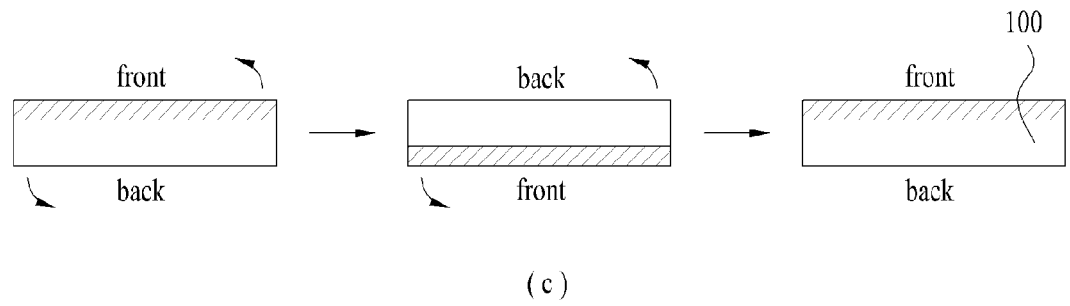
(c)

FIG. 17
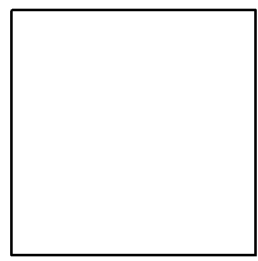
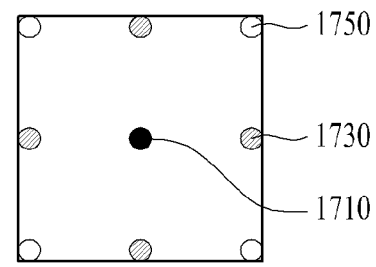
(a)
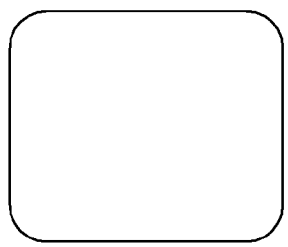
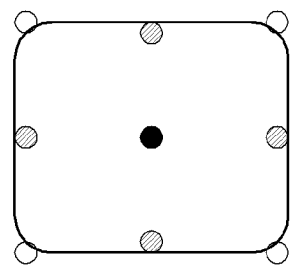
(b)
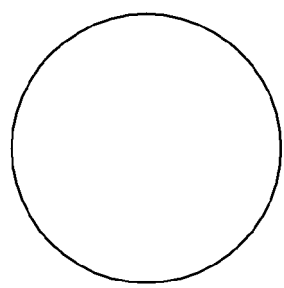
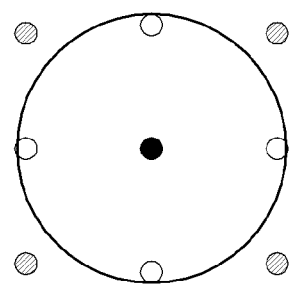
(c)

MOBILE TERMINAL AND CONTROLLING METHOD THEREOF

CROSS REFERENCE TO RELATED APPLICATIONS

Pursuant to 35 U.S.C. §119(a), this application claims the benefit of earlier filing date and right of priority to Korean Patent Application No. 10-2010-0133029, filed on Dec. 23, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing a user interface using such a visual effect as applying modeling of physics laws.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or video files, game play, broadcast reception and the like for example.

To support and increase of the terminal functions, it may be advantageous to consider the improvement of structural parts and/or software parts of the terminal.

Recently, as a mobile terminal tends to be equipped with a touch GUI (graphic user interface) using a touchscreen, the demand for a user-oriented UI (user interface) for modifying or changing shapes or arrangement states of objects freely is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a more convenient user interface can be provided.

Another object of the present invention is to provide a mobile terminal and controlling method thereof, by which shapes or arrangement states of objects can be changed according to various inputs to correspond to relative relations of inter-object positions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a plurality of objects, a sensing unit configured to detect a motion of the mobile terminal, and a controller, if detecting the motion in a prescribed direction via the sensing unit, moving a plurality of the objects on the touchscreen to correspond to a direction of the motion, the controller controlling a plurality of the objects to be respectively modified in accordance with an arranged form of a plurality of the objects due to the move.

In another aspect of the present invention, a method of controlling a mobile terminal includes the steps of displaying a plurality of objects on a touchscreen, detecting a motion of the mobile terminal via a sensing unit, moving a plurality of the objects on the touchscreen to correspond to a direction of the motion, and modifying a plurality of the objects respectively in accordance with an arranged form of a plurality of the objects due to the move.

Accordingly, the present invention provides the following effects and/or advantages.

First of all, the present invention provides a more convenient user interface. In particular, the present invention is able to change arrangement states and/or shapes of objects through an effect as if such an external force corresponding to a user's command input to a user interface as gravity and pressure is applied to display objects, thereby providing convenience accompanied with various visual effects.

Secondly, the present invention enables a display object to be elastically modified by an external force corresponding to the user's command input, thereby maximizing a customizing effect per user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating one example of modifying an arrangement state and shape of an elastic icon in accordance with an inclination in a mobile terminal according to one embodiment of the present invention;

FIG. 7 is a diagram illustrating one example of modifying an arrangement state and shape of an elastic icon in a mobile terminal according to one embodiment of the present invention;

FIG. 8 is a diagram illustrating one example of excluding modification of an arrangement state and shape of a selected icon in a mobile terminal according to one embodiment of the present invention;

FIG. 9 is a diagram illustrating another example of excluding modification of an arrangement state and shape of a selected icon in a mobile terminal according to one embodiment of the present invention;

FIG. 12 is a diagram illustrating one example of restoring an arrangement state and shape of an elastic icon in a mobile terminal according to one embodiment of the present invention;

FIG. 17 is a diagram illustrating one example of arranging a manipulation point of an elastic object according to one embodiment of the present invention.

DETAILED DESCRIPTION OF THE INVENTION

In the following detailed description, reference is made to the accompanying drawing figures which form a part of and show by illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
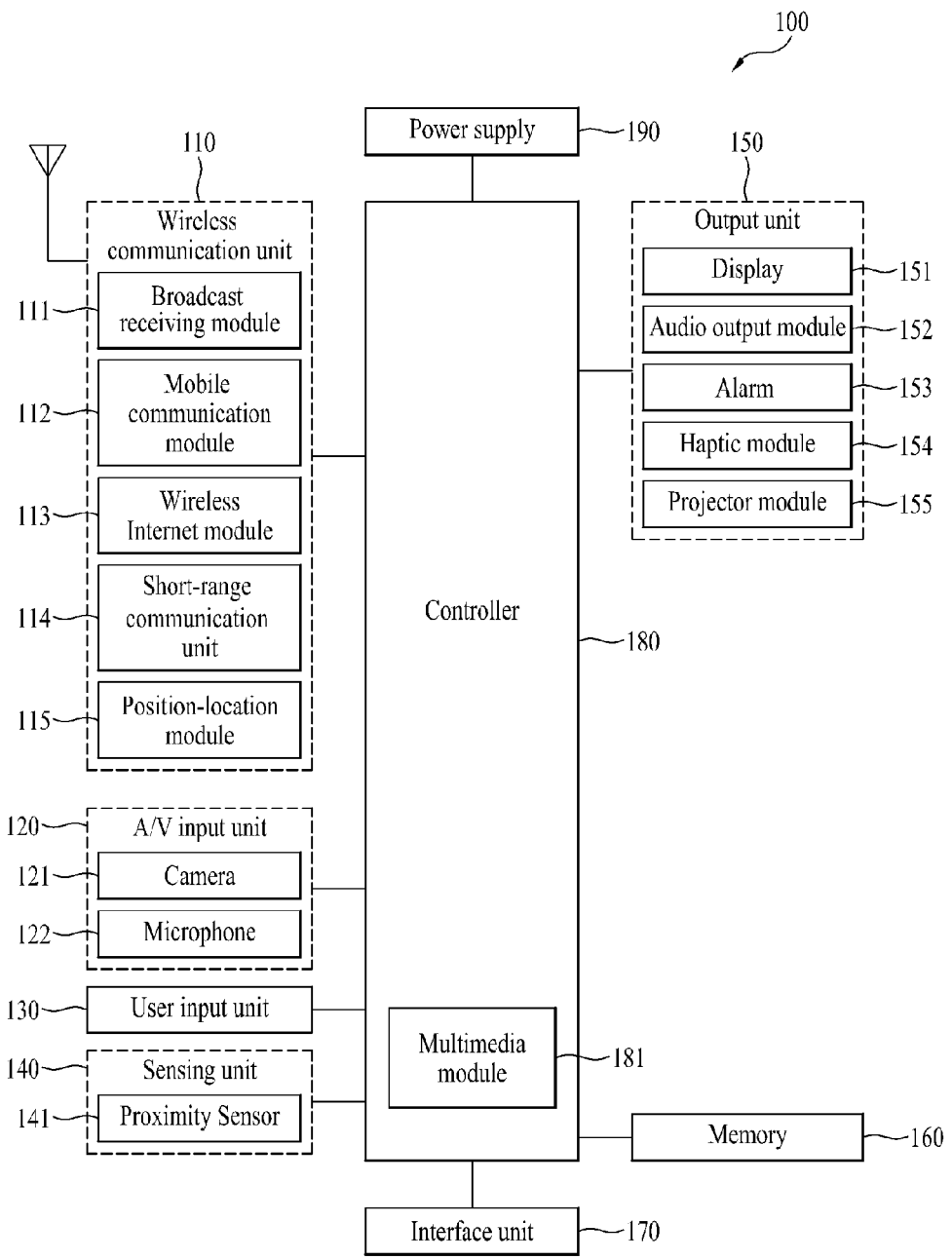
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which includes a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless Internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 during a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some instances, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is possible to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 detects whether a prescribed portion of the display 151 is touched.

With continued reference to FIG. 1, proximity sensor 141 can be provided to an internal area of the mobile terminal 100 enclosed by the touchscreen or proximate to the touchscreen. The proximity sensor 141 is the sensor that detects a presence or non-presence of an object approaching a prescribed detecting surface or an object existing around the proximity sensor 141 using an electromagnetic field strength or infrared ray without mechanical contact. Hence, the proximity sensor 141 has durability longer than that of a contact type sensor and also has utility wider than that of the contact type sensor.

The proximity sensor 141 can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, aim or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display 151, on an external screen or wall according to a control signal of the controller 180.

In particular, the projector module 155 can include a light source generating light (e.g., laser) for projecting an image externally, an image producing element for producing an image to output externally using the light generated from the light source, and a lens for enlarging the image for output externally at predetermined focus distance. The projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-minor device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory unit 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. Also, the mobile terminal 100 can operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern recognizing process for recognizing a writing input and a picture drawing input carried out on the touchscreen as characters or images, respectively.

The power supply unit 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
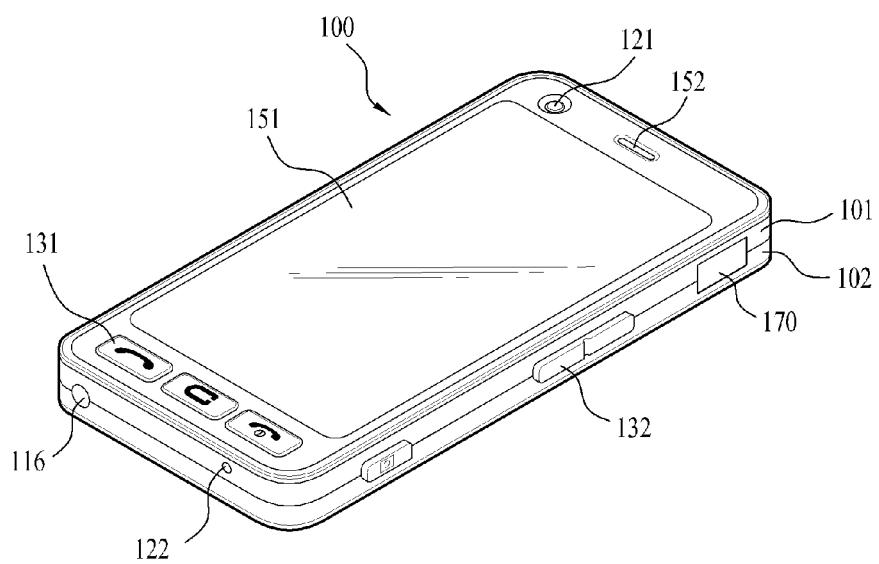
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. A command for volume adjustment of sound output from the audio output unit 152, a command for switching to a touch recognizing mode of the display 151 or the like can be input to the second manipulating unit 132. A retractable antenna 116 can also be provided to the terminal 100.

Interconnected operational mechanism between the display 151 and the touchpad 135 are explained with reference to FIG. 3 as follows.

Figure 3:
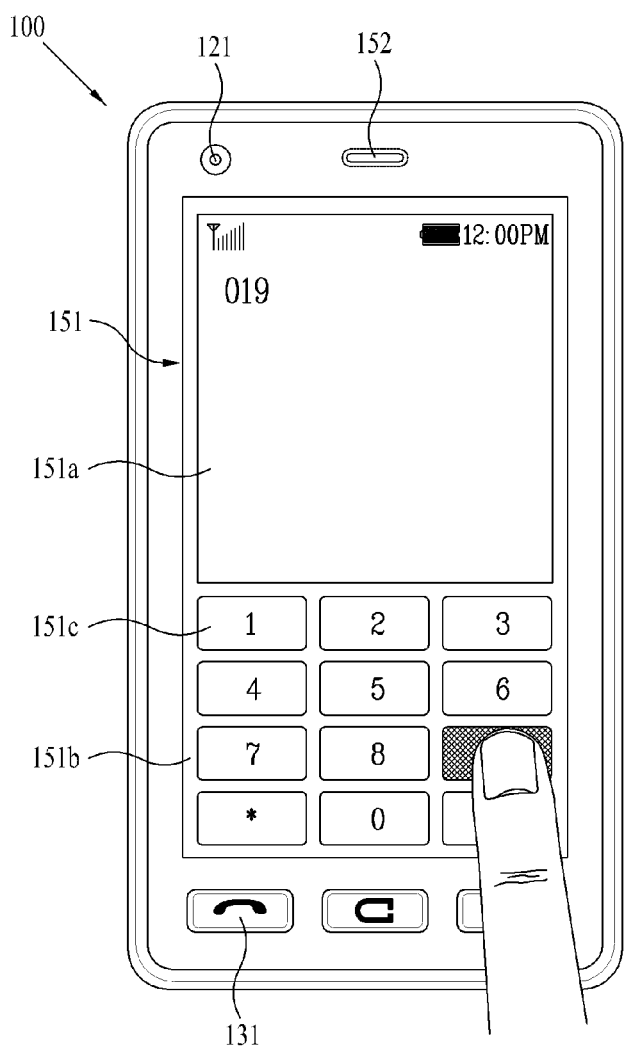
FIG. 3 is a front diagram of a mobile terminal according to one embodiment of the present invention to describe one operative status thereof.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is input through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is output to the input window 151b. If the soft key 151c is touched, a digit corresponding to the touched soft key is output to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, when a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to the terminal body being held by a user using a thumb and a first finger (clamping). The above function can include activation or deactivation for the display 151 or the touchpad 135.

Elastic Object

In a user interface of a mobile terminal according to embodiments of the present invention, shapes or arrangement states of display objects are elastically modifiable or transformable in accordance with a user command input. In this instance, the display objects correspond to the icons, widgets, keypad, application running regions and the like, which are displayed on the touchscreen. In particular, a single icon indicates a single file or performs a shortcut function for a specific file, application or menu. In addition, 'elastically transformable'means that an object is flexibly/elastically changed by physics law modeling in accordance with a relative arrangement relation with another neighbor object or a user's command input instead of having a fixed shape. In the present specification, a display object, of which shape or arrangement state is elastically modifiable, is named an 'elastic object'.

A method of modifying a shape or arrangement state of an elastic object according to an embodiment of the present invention will be explained with reference to FIG. 4.

Figure 4:
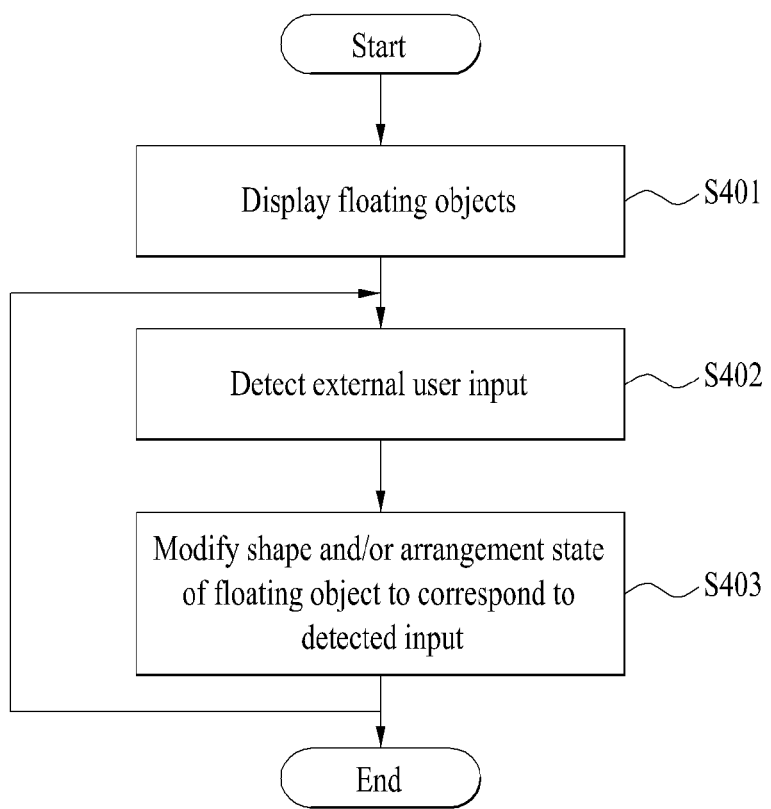
FIG. 4 is a flowchart illustrating one example of a method of controlling a user interface, to which elastic objects are applied, according to one embodiment of the present invention.

In particular, FIG. 4 is a flowchart illustrating one example of a method of controlling a user interface, to which elastic objects are applied, according to one embodiment of the present invention. Referring to FIG. 4, the controller 180 displays an elastic object on the touchscreen (S401).

Further, the elastic object is displayed on an initial screen when power is applied to the mobile terminal or a user command for displaying the initial screen (e.g., home screen) is input. Alternatively, the elastic object can be displayed if an application including the elastic object is run. Alternatively, when the elastic object is a keypad, the elastic object can be displayed if a field for enabling a text string input is selected.

Once the elastic object is displayed, the controller 180 can detect a user's command input (S402). In addition, the user's command input can include a touch input performed via such a command input as the touchscreen 151 and the key button 130 or an external force applied to the mobile terminal 100 using the gravity/acceleration/gyro sensor 140 or the like.

If the user's command input is detected, the controller 180 modifies a shape and/or arrangement state of the elastic object to correspond to the detected user's command input (S403). In particular, the controller 180 converts the user's command input to a physical force (e.g., acceleration, pressure, gravity, tensile force, etc.) applied to the arrangement. The controller 180 then displays a result (e.g., move, modification, color change, etc.) from applying the physical force to the elastic object.

Examples of modifying a shape/arrangement state of an elastic object according to a command input are described as follows. First of all, if a user accelerates a mobile terminal in a prescribed direction, an elastic object is modified into a pressurized shape or can move in a direction opposite to a direction of the acceleration according to inertia. In doing so, the controller 180 can consider relative relations among elastic objects. For instance, when prescribed weights are given to a plurality of elastic objects, respectively, one object is placed onto another object having a prescribed weight, assuming that gravity applies downward. On this assumption, the controller 180 determines that the former elastic object placed below is pressurized by the weight of the latter object placed above. The controller 180 can then modify the former elastic object placed below into a flat shape.

The above-described method of modifying the shape or arrangement state of the elastic object is applied in a cyclic manner. Therefore, the corresponding method can cumulatively modify the shape or arrangement state of the corresponding elastic object.

In the following description, the command input and the modification of the shape/arrangement state of the elastic object are explained in detail. In particular, FIG. 5 is a diagram illustrating one example of modifying an arrangement state and shape of an elastic icon in accordance with an inclination in a mobile terminal according to one embodiment of the present invention.

In FIG. 5, a left side schematically shows a bottom view of a shape to indicate an inclination of a mobile terminal 100, while a right side shows a front view of the mobile terminal 100. Referring to FIG. 5(a), while the mobile terminal 100 is horizontally placed, a home screen is displayed on the touchscreen. In this example, 9 elastic icons are arranged on the home screen and a prescribed virtual weight is given to each of the elastic icons.

When the mobile terminal 100 is inclined to a left side, as shown in FIG. 5(b), the controller 180 receives an inclination information from the sensing unit 140, determines that gravity applies to the left side, and then applies it to each of the elastic icons. Therefore, shapes of the elastic icons on the touchscreen are changed in accordance with the gravity applied in the left direction and positions of the moving-left elastic icons are changed relative to neighbor icons. In particular, because the icons 510 in a left-side column incur weights of the icons 510 in the middle column and weights of the icons 530 in a right-side column, the icons 510 in the left side are modified flatter in a vertical direction than the icons 520 (which incur the weights of the right-column icons 530) in the middle column. A rate of modifying the elastic icons and a moving speed of the elastic icons can be set proportional to the inclination or can differ in accordance with a virtual weight individually set for each of the icons.

Figure 6:
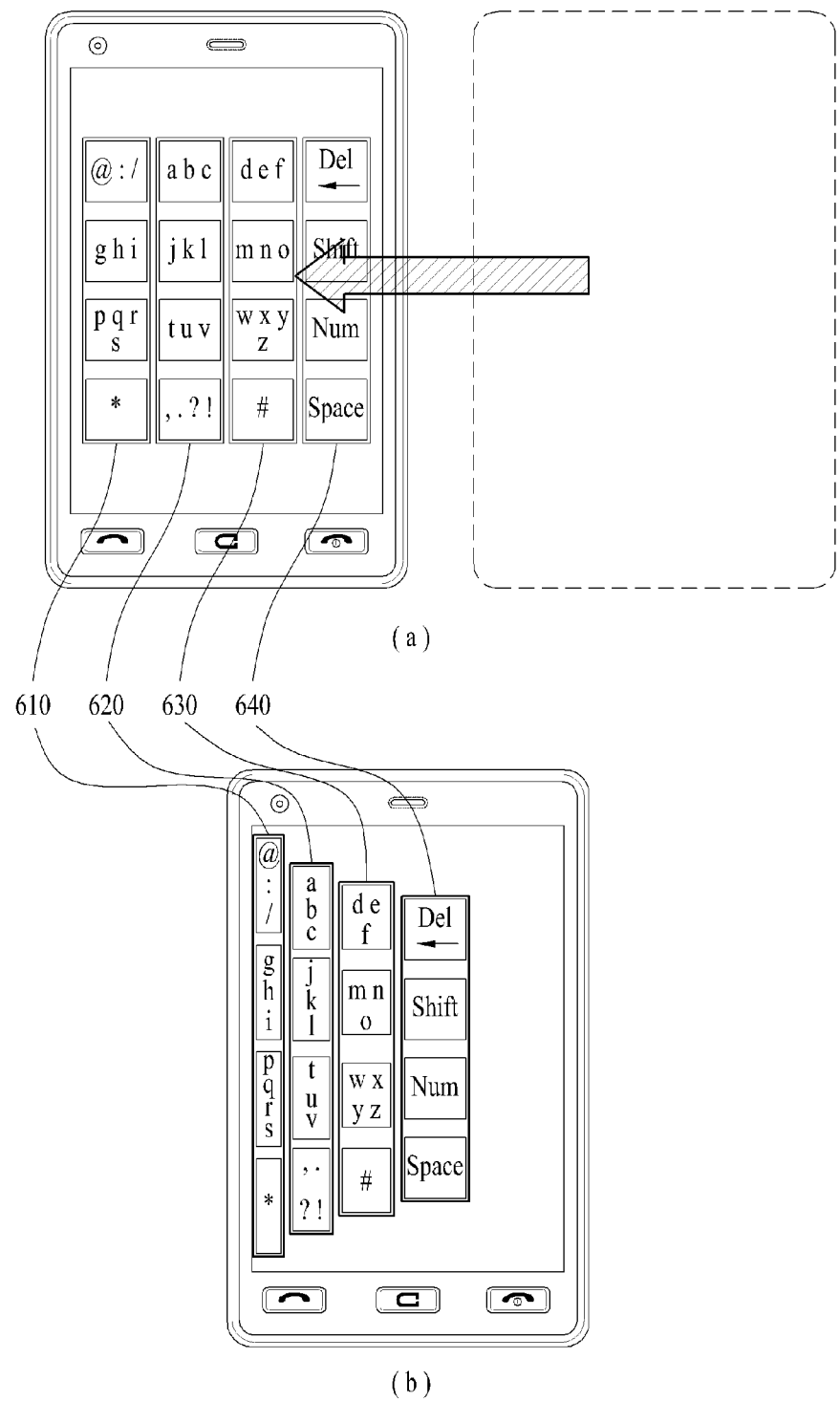
FIG. 6 is a diagram illustrating one example of modifying an arrangement state and shape of an elastic icon in accordance with an acceleration in a mobile terminal according to one embodiment of the present invention.

Next, FIG. 6 is a diagram illustrating one example of modifying an arrangement state and shape of an elastic icon in accordance with an acceleration in a mobile terminal according to one embodiment of the present invention. In FIG. 6, assume that 16 key buttons of a virtual keypad displayed on the touchscreen are elastic objects and that a prescribed virtual weight is given to each of the 16 key buttons.

Referring to FIG. 6(a), if the mobile terminal moves in a left direction and then stops, a direction of acceleration becomes a right direction. Therefore, the controller 180 receives acceleration information from the sensing unit 140 and then applies it to each of the key buttons (FIG. 6(b)). In particular, the key buttons gather in the left direction that is opposite to the direction of the acceleration. Because the icons placed in a left column are more pressurized in the right direction by weights of more icons, a rate of modification can follow the order of '610>620>630>640'. In this instance, a different color can be given to each of the key buttons in accordance with the modified rate of the corresponding key button. Also, how to display information indicating characters on the corresponding key button can be modified as well. For instance, the indication 'abc' displayed on the key button matching alphabets placed on a top end of a second left column 620 is displayed in a horizontal direction in FIG. 6(a), while displayed in a vertical direction in FIG. 6(b).

Meanwhile, user input can differentiate a modification/position change by giving a specific parameter value to an elastic object. This is described with reference to FIG. 7 as follows. In particular, FIG. 7 is a diagram for one example of modifying an arrangement state and shape of an elastic icon in a mobile terminal according to one embodiment of the present invention.

In FIG. 7, assume that a plurality of elastic icons are displayed on the touchscreen and that the controller 180 recognizes a frequency in a user's selection/manipulation of each of the icons. Referring to FIG. 7(a), when two icons 710 and 720 among 18 elastic icons are used more frequently than the rest of the icons, horizontal rows 715 and 725 including the icons 710 and 720 having high use frequency are excluded from the position shift and modification when such acceleration as shown in FIG. 6(a) is detected.

Referring to FIG. 7(b), as a heavier virtual weight is given to the icons 730 having a high use frequency, and if the mobile terminal is accelerated in a right direction or is inclined in a left direction, the icons 730 can be aligned in a prescribed direction as if sinking to the left side.

Meanwhile, after prescribed elastic objects have been selected, a modification/position shift can be controlled in accordance with a user's input not to be applied to the selected objects. This is described with reference to FIG. 8 as follows. In particular, FIG. 8 is a diagram illustrating one example of excluding a modification of an arrangement state and shape of a selected icon in a mobile terminal according to one embodiment of the present invention.

In FIG. 8, assume that a home screen is displayed on a touchscreen including 9 elastic icons arranged on the home screen and that a prescribed virtual weight is given to each of the icons. Referring to FIG. 8(a), an elastic icon 810 can be selected from the home screen through a touch input. While a user maintains the touch input, and if the mobile terminal is inclined to the right, the rest of the icons except the selected icon 810 are moved to the right (FIG. 8(b)).

When an icon 810 selected via a touch input is situated at a center of the home screen (FIG. 8(c)), and if a user inclines the mobile terminal to the right while maintaining the touch input, an icon 820 situated on the right side of the selected icon 810 may not be moved or modified. This visually indicates that the selected icon 810 supports the left icon in a direction against gravity or acceleration.

Next, FIG. 9 is a diagram illustrating another example of excluding modification of an arrangement state and shape of a selected icon in a mobile terminal according to one embodiment of the present invention. The same assumptions of FIG. 8 apply to FIG. 9.

Referring to FIG. 9, while an icon 910 is selected via a touch input, and if a user inclines the mobile terminal to the right (FIG. 9(a)), the rest of the icons except the selected icon 910 are modified in accordance with their relative positions by moving to the left (FIG. 9(b)). After the user has multi-touched the selected icon using two fingers 920 and 930, and if the user moves his/her finger 930 by maintaining the touched state of the corresponding finger 930, a size of the corresponding icon 910 changes (FIG. 9(c)). After the size of the icon 910 has changed, and if the mobile terminal is placed back to a horizontal position, the rest of the icons return to the state shown in FIG. 9(a) (FIG. 9D). Yet, the icons situated on a middle row can maintain their modified states due to the size-changing icon 910.

Meanwhile, a plurality of elastic icons excluded from the modifications of the arrangement state and shape can be selected. This is described with reference to FIG. 10 as follows. In particular, FIG. 10 is a diagram illustrating yet another example of excluding modification of an arrangement state and shape of a selected icon in a mobile terminal according to one embodiment of the present invention.

Figure 10:
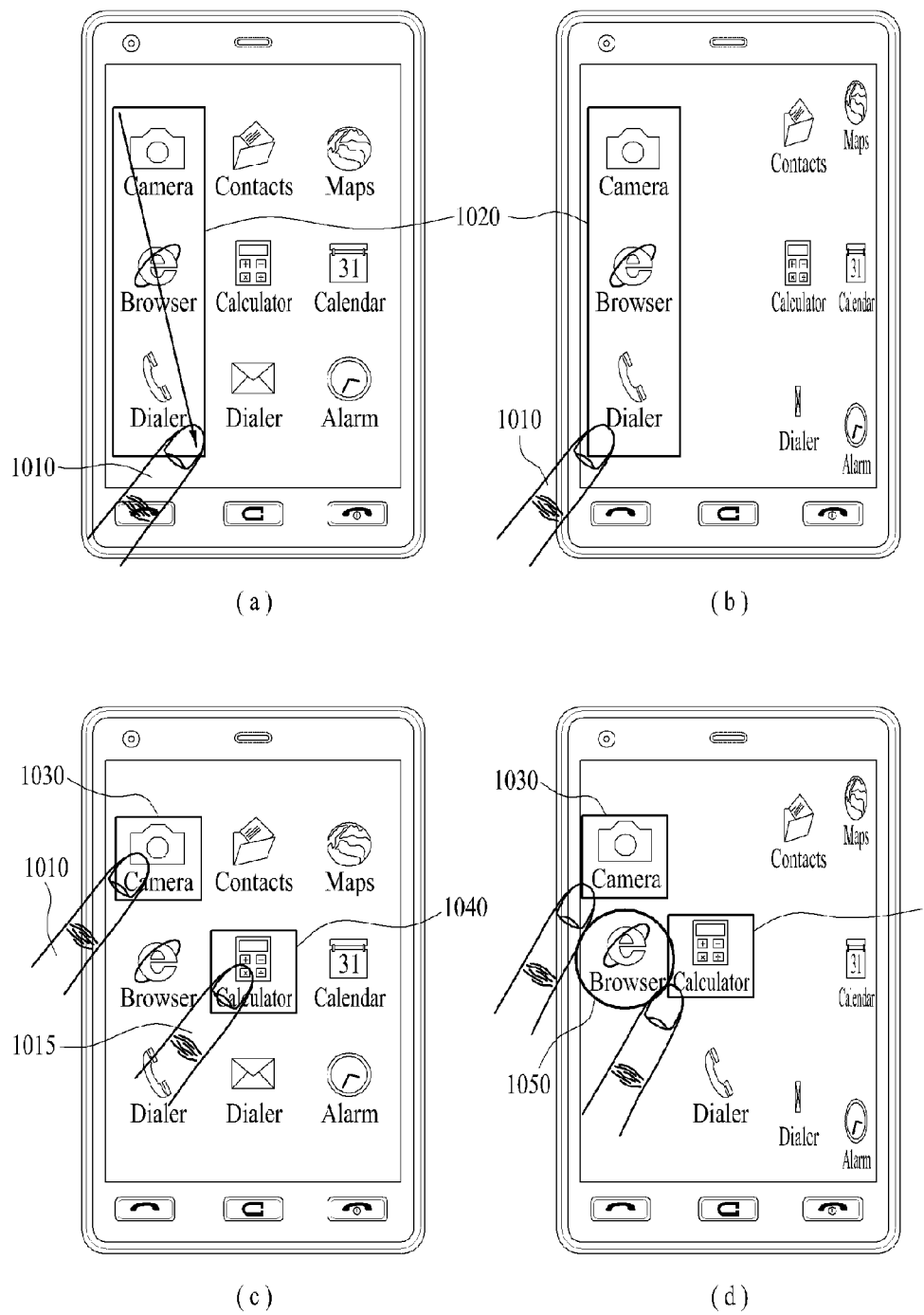
FIG. 10 is a diagram illustrating yet another example of excluding modification of an arrangement state and shape of a selected icon in a mobile terminal according to one embodiment of the present invention.

Referring to FIG. 10, while a region 1020 containing three icons situated in a left column is designated by a drag & touch input using a finger 1010 (FIG. 10(a)), and if a user inclines the mobile terminal to the right, the rest of the icons except the icons contained in the selected region 1020 are modified in accordance with their relative positions by moving to the right (FIG. 10(b)).

Although a plurality of the icons are selected by the region designating method in FIGS. 10(a) and 10(b), a multi-touch method may be used as well. In particular, while a user touches two icons 1030 and 1040 with two fingers 1010 and 1015, respectively (FIG. 10(c)), and if the user inclines the mobile terminal to the right, the icons except the touched icons are modified in accordance with their relative positions by moving to the right (FIG. 10(d)). In doing so, the icon 1050 situated to the left side of the center icon 1040 is excluded from the move and modification. This visually indicates that the selected icon 1040 supports the left icon 1050 in a direction against gravity or acceleration, like the former instance shown in FIG. 8(c).

Meanwhile, while at least one elastic icon is selected, and if an acceleration or an inclination is detected, icons except the selected icon are moved or modified. Thereafter, if another input is applied, the icons can be shifted or modified. This is described with reference to FIG. 11 as follows.

Figure 11:
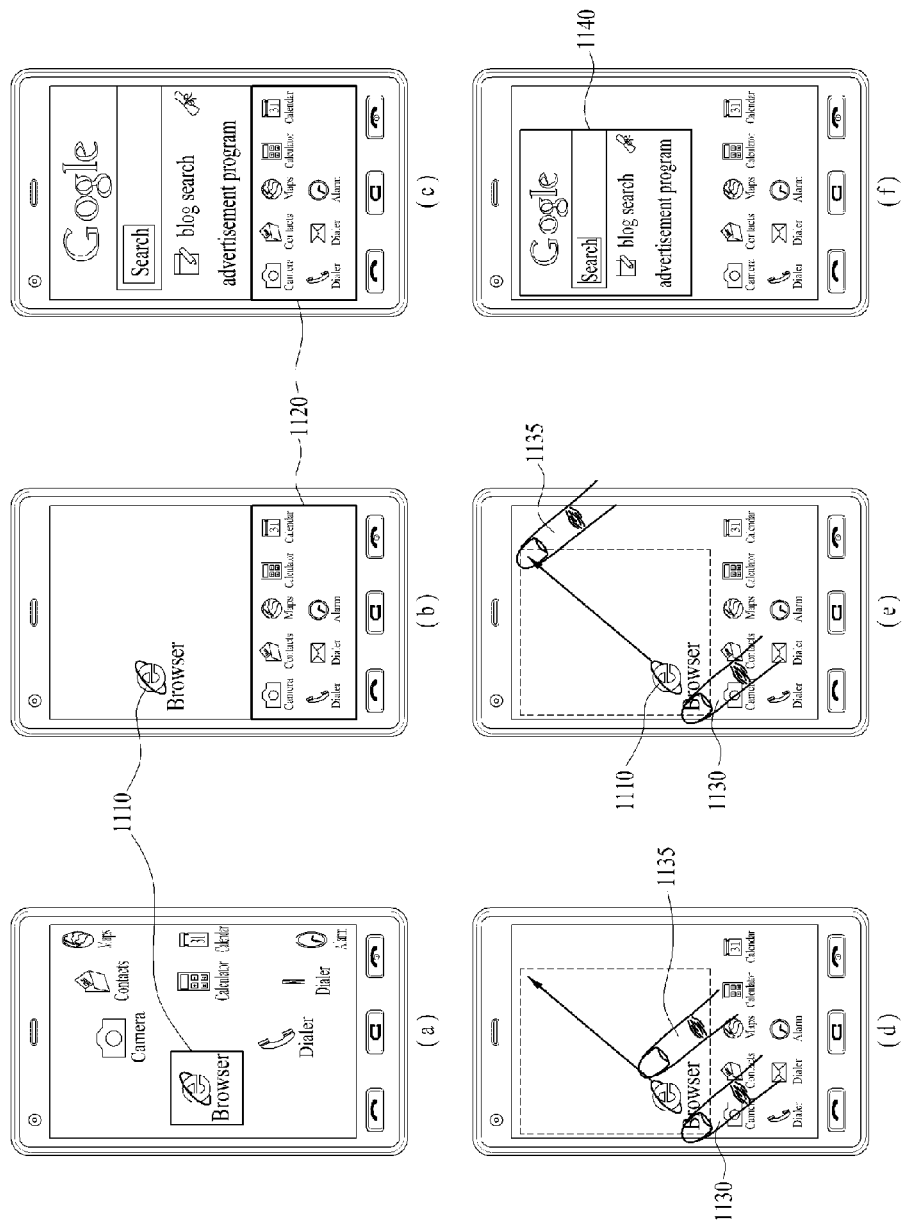
FIG. 11 is a diagram illustrating one example of modifying an arrangement state and shape of an elastic icon multiple times in a mobile terminal according to one embodiment of the present invention.

FIG. 11 is a diagram illustrating one example of modifying an arrangement state and shape of an elastic icon multiple times in a mobile terminal according to one embodiment of the present invention. The same assumptions of FIG. 8 apply to FIG. 11.

Referring to FIG. 11, while the rest of the icons except a selected icon 1110 are modified by moving to the right (FIG. 11(a)), and if the controller 180 detects a vertical shaking, the rest of the icons except the selected icon 1110 can be arranged in a region 1120 previously set on a bottom side of the touchscreen (FIG. 11(b)). Afterwards, if the selected icon 1110 is selected again by a touch input, an application or widget corresponding to the selected icon can be run in a region except the bottom region 1120 (FIG. 11(c)).

While the selected icon 1110 is multi-touched with two fingers 1130 and 1135 in the state shown in FIG. 11(b) (FIG. 11(d)), and if the finger 1135 is moved by maintaining the touch (FIG. 11(e)), a region 1140 is designated having the points touched with the two fingers included as apexes opposing each other diagonally. Hence, an application or widget corresponding to the selected icon can be run in the designated region 1140 (FIG. 11(f)).

In the following description, a method of returning a modified position/shape of an elastic object to an original state is described with reference to FIG. 12. In particular, FIG. 12 is a diagram illustrating one example of restoring an arrangement state and shape of an elastic icon in a mobile terminal according to one embodiment of the present invention. FIG. 12 assumes a situation that follows the former situation shown in FIG. 8(b).

Referring to FIG. 12(a), a user can designate a region 1220 containing icons, of which shapes/positions are modified, using his/her finger 1210. Thereafter, if the controller 180 detects a shaking of the mobile terminal, the icons contained in the designated region 1220 can return to their original states (FIG. 12(*b*)).

When a shape/position of an elastic object is modified by inclining the mobile terminal, the object whose shape/position is modified can be returned to its original state by inclining the mobile terminal in an opposite direction. Alternatively, when a shape/position of an elastic object is modified using acceleration, the object whose shape/position is modified can be returned to its original state by accelerating the mobile terminal in an opposite direction.

Alternatively, objects whose shapes/positions are modified can be returned to their original state by enabling the mobile terminal 100 to turn a full circle in a prescribed direction (FIG. 12(*c*)).

Meanwhile, an elastic object according to the present invention can be implemented into such a configuration containing a plurality of sub-objects as a keypad itself and a menu box instead of including an object configured as an individual unit such as an icon, a key button of a keypad and the like. In particular, a keypad including key buttons as sub-objects or a menu box including menu icons as sub-objects can be implemented into an elastic object as well. In the present specification, an object including a plurality of sub-objects is named an object of a 'container type'.

When an elastic object is a container type, as a container itself is modified to correspond to a user's command input, a shape of a sub-object included in the elastic object can correspond to the modification of the container as well. This is described with reference to FIG. 13 as follows. In particular, FIG. 13 is a diagram illustrating one example of modifying an elastic object of a container type in a mobile terminal according to one embodiment of the present invention.

In the following drawings including FIG. 13, assume that an elastic object of a container type is a keypad of QWERTY type, for example. Moreover, the following embodiments are applicable to an elastic object of every type.

Figure 13:
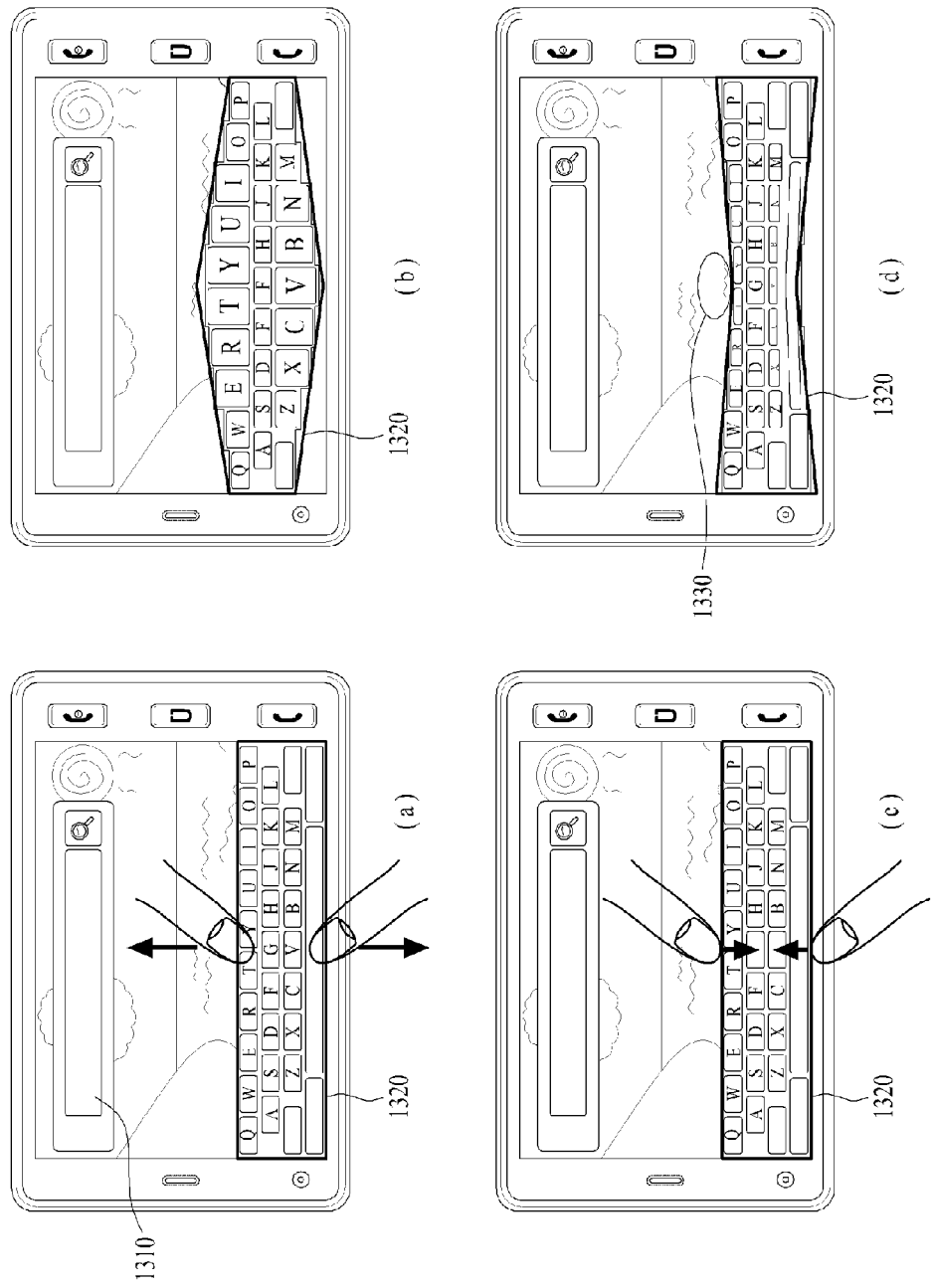
FIG. 13 is a diagram illustrating one example of modifying an elastic object of a container type in a mobile terminal according to one embodiment of the present invention.

Referring to FIG. 13, if a text-inputtable window 1310 is selected, a keypad 1320 for a text input can be displayed (FIG. 13(*a*)). After the keypad 1320 has been displayed, in order to enlarge a size of a middle part of the keypad 1320, a user multi-touches top and bottom sides of the middle part of the keypad 1320 with two fingers and then pinches out the touched points to be farther spaced apart from each other. If so, the middle part of the keypad 1320 is expanded and modified by becoming convex in a vertical direction (FIG. 13(*b*)). In doing so, key buttons provided to the middle part of the keypad 1320 can be enlarged to correspond to the expansion of the keypad 1320.

On the contrary, after the keypad 1320 has been displayed, in order to reduce a size of a middle part of the keypad 1320, a user multi-touches top and bottom sides of the middle part of the keypad 1320 with two fingers and then pinches in the touched points to get closer to each other (FIG. 13(*c*)). If so, the middle part of the keypad 1320 is contracted and modified by becoming concave in a vertical direction (FIG. 13(*d*)). In doing so, key buttons provided to the middle part of the keypad 1320 can be reduced to correspond to the reduction of the keypad 1320.

Meanwhile, as the keypad is reduced, a background image 1330, which was not viewable by being covered with the keypad 1320, can appear. Therefore, a user is further facilitated to select a prescribed key button as prescribed key buttons are enlarged by expanding a specific part of a keypad. In addition, the user can check a part covered with the keypad by reducing a specific part of the keypad.

Although FIG. 13 shows a method of expanding or contracting a keypad in a vertical direction, this method is applicable to a horizontal or diagonal direction and is also applicable to modification in at least two directions sequentially or simultaneously. Meanwhile, a total size of an elastic keypad is modifiable as well as a specific part thereof. This is described with reference to FIG. 14 as follows. In particular, FIG. 14 is a diagram illustrating another example of modifying an elastic object of a container type in a mobile terminal according to one embodiment of the present invention.

Figure 14:
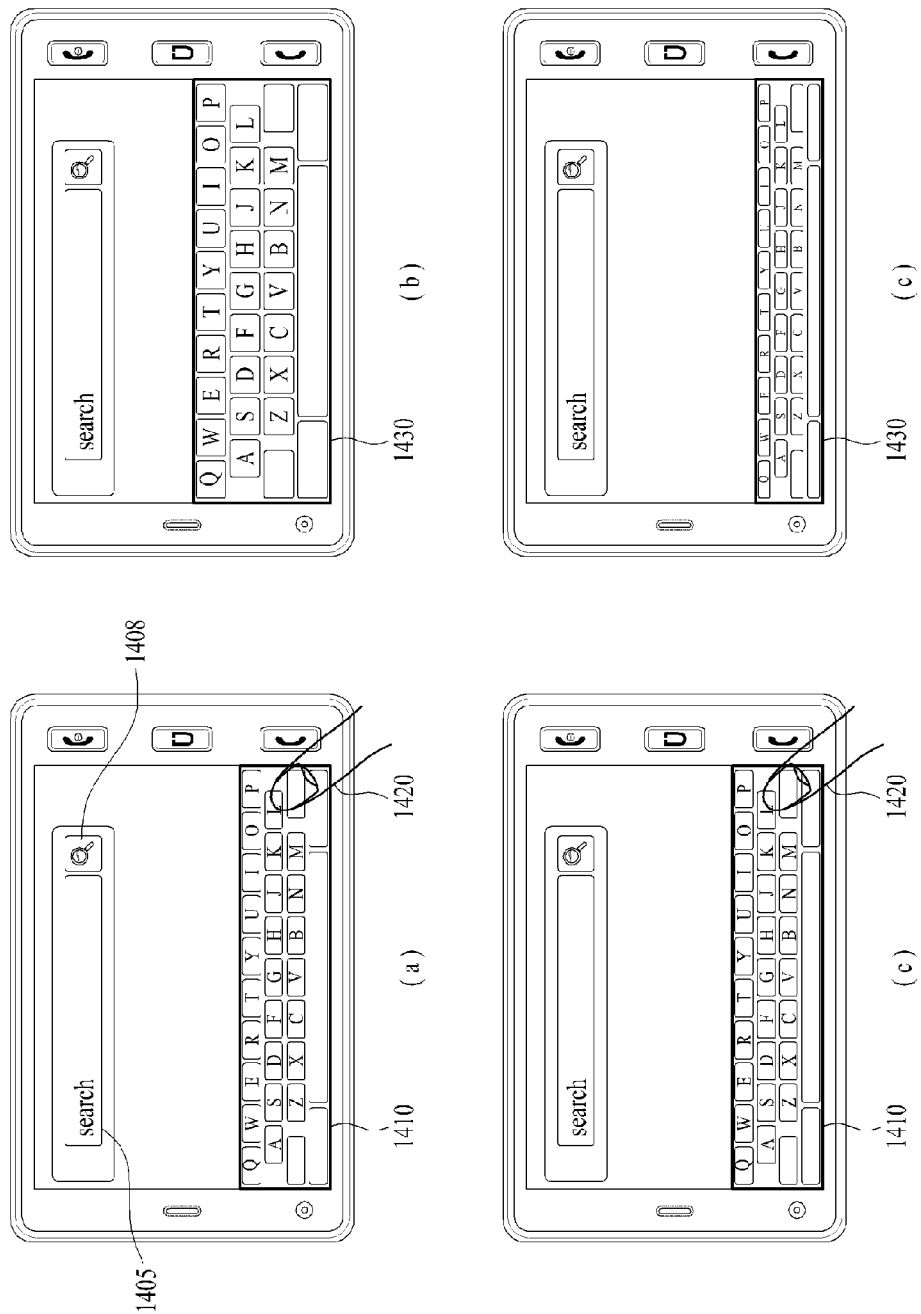
FIG. 14 is a diagram illustrating another example of modifying an elastic object of a container type in a mobile terminal according to one embodiment of the present invention.

Referring to FIG. 14, if a text-inputtable window 1405 is selected, a keypad 1410 for a text input is displayed (FIG. 14(*a*)). After the keypad 1410 has been displayed, if a user inclines the mobile terminal upward while selecting the keypad 1410 with a finger 1420, the keypad 1430 can be expanded in a top direction (FIG. 14(*b*)). Accordingly, key buttons included in the keypad 1430 can be enlarged in vertical size.

In this instance, the selection of the keypad 1410 can be performed by touching a region on the keypad free from key buttons, applying a touch input having a size exceeding a predetermined value, performing a long touch to a random key button, or the like. On the contrary, if a user inclines the mobile terminal downward while selecting the keypad 1410 with a finger 1420 (FIG. 14(*c*)), the keypad 1430 can be contracted in a bottom direction (FIG. 14(*d*)). Accordingly, key buttons included in the keypad 1430 can be reduced in vertical size.

In the above-described method of modifying the size of the elastic keypad, the action of inclining the mobile terminal can be substituted with an action of accelerating the mobile terminal. Also, the selection of the keypad can be replaced by performing a long-touch to a region except the keypad, e.g., a search icon 1408 in a search window 1405.

In the following description, a method of modifying a keypad with reference to a random point on a keypad is explained with reference to FIG. 15. In particular, FIG. 15 is a diagram illustrating still another example of modifying an elastic object of a container type in a mobile terminal according to one embodiment of the present invention.

Figure 15:
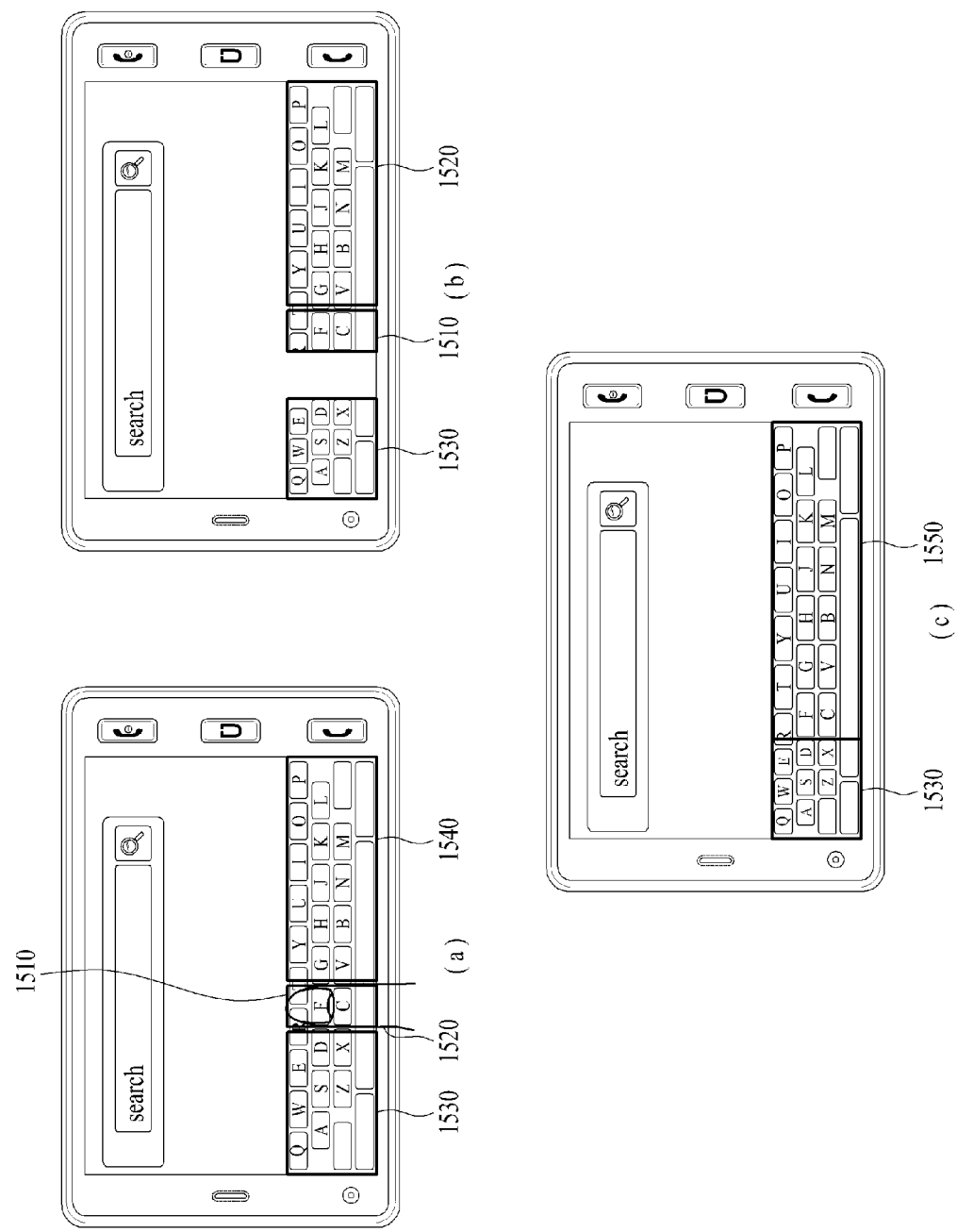
FIG. 15 is a diagram illustrating still another example of modifying an elastic object of a container type in a mobile terminal according to one embodiment of the present invention.

In FIG. 15, assume a user attempts to expand a right keypad region to the left with reference to a position where key buttons 'f' and 'c' are situated. Referring to FIG. 15, a user can designate a region 1510, which becomes a reference of keypad modification, by a touch with a finger 1520. Hence, the keypad can be divided into a left side 1530 and a right side 1540 centering on the reference region 1510 (FIG. 15(*a*)). While the reference region 1510 is selected, if the mobile terminal is inclined to the left, the left region 1530 adjacent to the reference region 1510 is contracted to the left (FIG. 15(*b*)). Thereafter, if the selection of the reference region 1510 is cancelled, a region 1550 including the reference region 1510 and the right region 1540 is expanded by a space resulting from contracting the left region 1530. Hence, key buttons provided to the expanded region can be expanded in vertical direction (FIG. 15(*c*)).

In the above-described keypad shape modifying method, the reference region can be set in advance. This is described with reference to FIG. 16 as follows. In particular, FIG. 16 is a diagram illustrating yet another example of modifying an elastic object of a container type in a mobile terminal according to one embodiment of the present invention.

Figure 16:
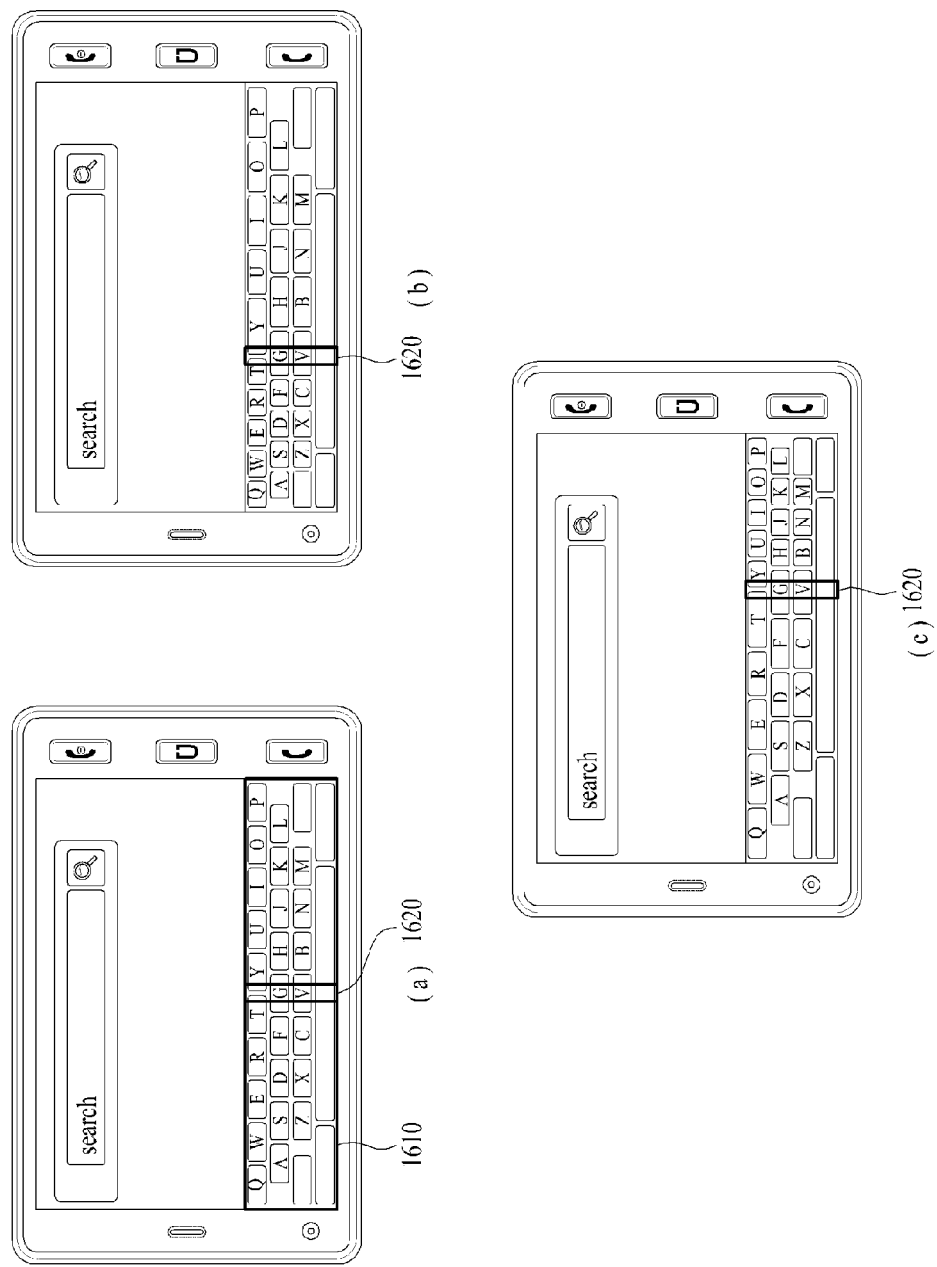
FIG. 16 is a diagram illustrating yet another example of modifying an elastic object of a container type in a mobile terminal according to one embodiment of the present invention.

Referring to FIG. 16, a prescribed visual effect can be given to a reference axis 1620 in the middle of a keypad 1610 (FIG. 16(*a*)). If the mobile terminal is inclined to the left, a left side next to the reference axis is contracted on the keypad 1610 and a right side next to the reference axis is expanded on the keypad (FIG. 16(b)). On the contrary, if the mobile terminal is inclined to the right, a right side next to the reference axis is contracted on the keypad 1610 and a left side next to the reference axis is expanded on the keypad (FIG. 16(c)).

In doing so, the reference axis 1620 may be set to be always displayed or may not. Moreover, whether to display the reference axis 1620 can be determined in accordance with a prescribed menu manipulation or by setting a position and a presence or non-presence of use in advance.

Meanwhile, the move and modification of an elastic object can be performed by manipulating a preset point per object. This is described with reference to FIG. 17 as follows. In particular, FIG. 17 is a diagram illustrating one example of arranging a manipulation point of an elastic object according to one embodiment of the present invention.

Referring to FIGS. 17(a) to 17(c), a manipulation point 1710 is arranged at a center of each diagram. After the corresponding manipulation point has been touched, and if the touched point is moved, a position of an elastic icon can be changed.

Moreover, a manipulation point 1730 for modifying a shape of an icon and a manipulation point 1750 for modifying a size of the corresponding icon are arranged on an edge of each diagram. After the corresponding manipulation point has been selected, and if the touched point is moved, a shape or size of an elastic icon can be correspondingly modified.

Figure 18:
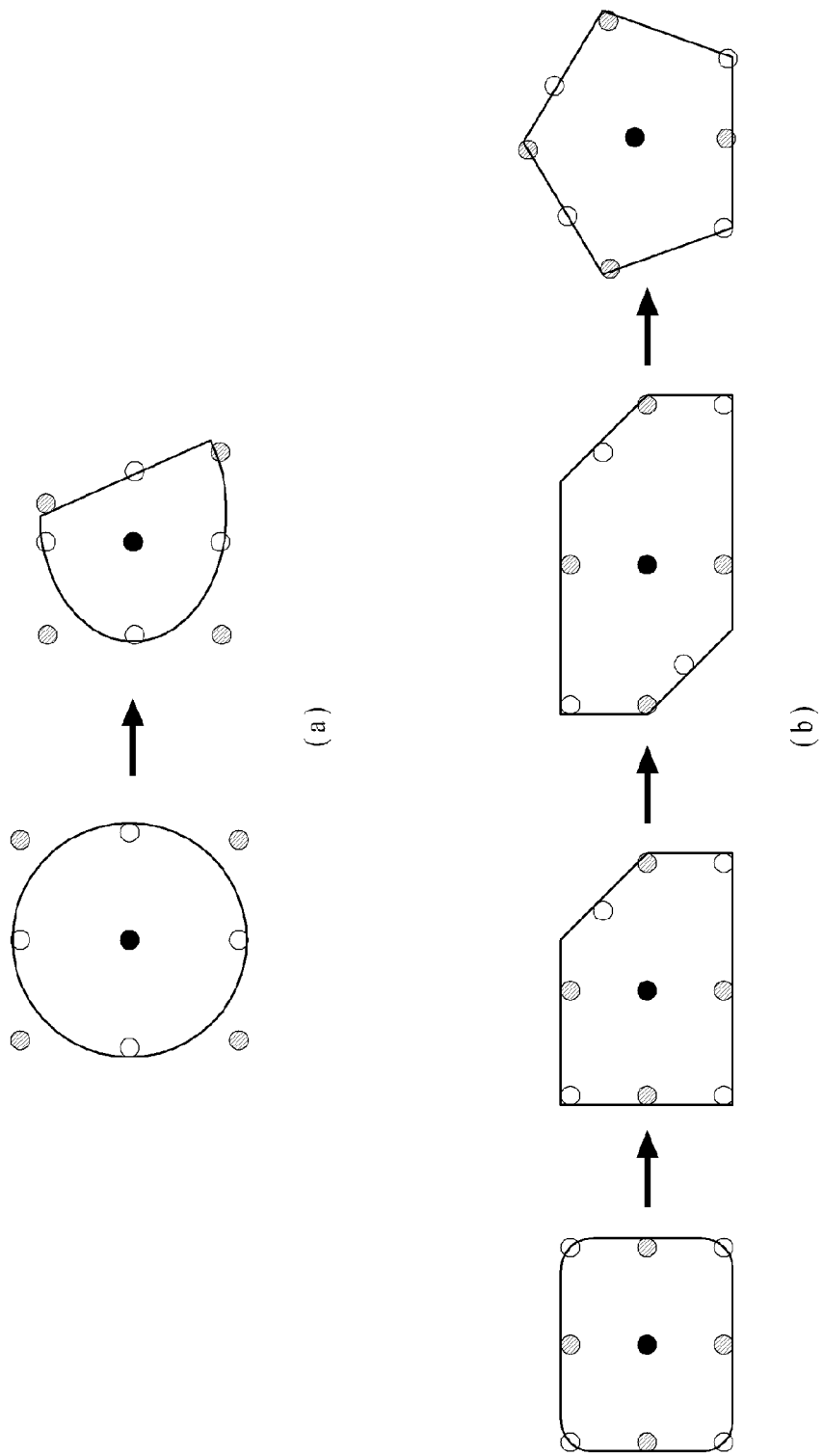
FIG. 18 is a diagram illustrating one example of performing modification using a manipulation point of an elastic object according to one embodiment of the present invention.

Detailed examples of using the above-described manipulation points are explained with reference to FIG. 18 as follows. In particular, FIG. 18 is a diagram illustrating one example of performing modification using a manipulation point of an elastic object according to one embodiment of the present invention.

Referring to FIG. 18(a), if a manipulation point for a shape modification, which is situated at a right top side of a circular elastic object, is moved to the left, a right side of the elastic object is contracted. Referring to FIG. 18(b), if a plurality of manipulation points of a quadrangular elastic object are sequentially moved, a shape of the corresponding elastic object can be modified 'from a quadrangle to a pentagon', 'from the pentagon to a hexagon', 'from the hexagon to the pentagon', and the like.

The arranged number and positions of the above-mentioned manipulation points are exemplary, by which the present invention is non-limited. In addition, the arranged number and positions of the above-mentioned manipulation points are applicable to various manipulation point arrangement patterns.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a touchscreen configured to display a plurality of display objects;
a sensing unit configured to detect a motion of the mobile terminal; and
a controller configured to move and modify a shape of the plurality of display objects to reflect a characteristic of the detected motion of the mobile terminal,
wherein when the sensing unit detects the motion of the mobile terminal is in a first direction, the controller is further configured to move the plurality of objects toward the first direction and to change shapes of display objects displayed closer to the first direction as being squished or pressed by display objects closer to a second direction that is opposite to the first direction, and
wherein the display objects displayed closer to the first direction are displayed as being smaller than the display objects closer to the second direction.

2. The mobile terminal of claim 1, wherein the first direction is to the left and the second direction is to the right, the first direction is to the right and the second direction is to the left, the first direction is to the top and the second direction is to the bottom, or the first direction is to the bottom and the second direction is to the top when viewing the touchscreen of the mobile terminal.

3. The mobile terminal of claim 1, wherein the motion includes at least one of an inclination of the mobile terminal and a speed or acceleration of the inclination of the mobile terminal.

4. The mobile terminal of claim 1, wherein when the plurality of display objects include specific designated objects, the controller is further configured to move and modify the shape of only display objects that are not specific designated objects.

5. The mobile terminal of claim 4, wherein the specific designated objects include at least one of display objects that have been touch selected, display objects that are designated as being frequently used display objects and display objects included within a specific user-designated region.

6. The mobile terminal of claim 4, wherein the controller is further configured not to move and modify the shape of display objects next to the specific designated objects so as to appear that the specific designated objects are physically supporting a weight of the display objects next to the specific designated objects.

7. The mobile terminal of claim 1, wherein the controller is further configured to return the display objects to their original position and shape based on at least one of a detected reverse motion that is reverse to the detected motion, a selection of a hot key on the mobile terminal, and a shaking motion of the mobile terminal.

8. The mobile terminal of claim 1, wherein the controller is further configured to move and modify a shape of the display objects in an amount that corresponds to a detected amount of motion.

9. A method of controlling a mobile terminal, the method comprising:
- allowing, via a wireless communication unit of the mobile terminal, wireless communication with at least one other terminal;
- displaying on a touchscreen of the mobile terminal a plurality of display objects;
- detecting, via a sensing unit of the mobile terminal, a motion of the mobile terminal; and
- moving and modifying a shape of the plurality of display objects, via a controller of the mobile terminal, to reflect a characteristic of the detected motion of the mobile terminal,
- wherein when the sensing step detects the motion of the mobile terminal is in a first direction, the moving and modifying step moves the plurality of objects toward the first direction and changes shapes of display objects displayed closer to the first direction as being squished or pressed by display objects closer to a second direction that is opposite to the first direction, and
- wherein the display objects displayed closer to the first direction are displayed as being smaller than the display objects closer to the second direction.

10. The method of claim 9, wherein the first direction is to the left and the second direction is to the right, the first direction is to the right and the second direction is to the left, the first direction is to the top and the second direction is to the bottom, or the first direction is to the bottom and the second direction is to the top when viewing the touchscreen of the mobile terminal.

11. The method of claim 9, wherein the motion includes at least one of an inclination of the mobile terminal and a speed or acceleration of the inclination of the mobile terminal.

12. The method of claim 9, wherein when the plurality of display objects include specific designated objects, the moving and modifying step moves and modifies the shape of only display objects that are not specific designated objects.

13. The method of claim 12, wherein the specific designated objects include at least one of display objects that have been touch selected, display objects that are designated as being frequently used display objects and display objects included within a specific user-designated region.

14. The method of claim 12, wherein the moving and modifying step moves and modifies the shape of display objects next to the specific designated objects so as to appear that the specific designated objects are physically supporting a weight of the display objects next to the specific designated objects.

15. The method of claim 9, further comprising:
- returning the display objects to their original position and shape based on at least one of a detected reverse motion that is reverse to the detected motion, a selection of a hot key on the mobile terminal, and a shaking motion of the mobile terminal.

16. The method of claim 9, wherein the moving and modifying step moves and modifies a shape of the display objects in an amount that corresponds to a detected amount of motion.

* * * * *